United States Patent
Uchiyama

(10) Patent No.: US 10,078,467 B2
(45) Date of Patent: Sep. 18, 2018

(54) STORAGE DEVICE, COMPUTER READABLE RECORDING MEDIUM, AND STORAGE DEVICE CONTROL METHOD

(71) Applicant: FUJITSU LIMITED, Kawasaki-shi, Kanagawa (JP)

(72) Inventor: Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 15/228,478

(22) Filed: Aug. 4, 2016

(65) Prior Publication Data

US 2017/0068483 A1    Mar. 9, 2017

(30) Foreign Application Priority Data

Sep. 3, 2015   (JP) .................. 2015-174124

(51) Int. Cl.
*G06F 12/00* (2006.01)
*G06F 3/06* (2006.01)

(52) U.S. Cl.
CPC .......... *G06F 3/0647* (2013.01); *G06F 3/0619* (2013.01); *G06F 3/0685* (2013.01)

(58) Field of Classification Search
CPC ..... G06F 3/0647; G06F 3/0619; G06F 3/0685
See application file for complete search history.

(56) References Cited

U.S. PATENT DOCUMENTS

| | | | | |
|---|---|---|---|---|
| 5,742,792 A * | 4/1998 | Yanai | ............... | G06F 3/0601 710/1 |
| 6,836,832 B1 * | 12/2004 | Klinkner | ............... | G06F 3/0605 711/170 |
| 2002/0141296 A1 | 10/2002 | Tezuka et al. | | |
| 2005/0195660 A1 * | 9/2005 | Kavuri | ............... | G06F 3/0605 365/189.05 |
| 2006/0107103 A1 * | 5/2006 | Rodrigues | ........... | G06F 11/1096 714/6.1 |
| 2008/0140730 A1 | 6/2008 | Toshine | | |
| 2008/0243860 A1 | 10/2008 | Cannon et al. | | |
| 2010/0312543 A1 | 12/2010 | Matsuda | | |
| 2017/0269862 A1 * | 9/2017 | Agombar | ............. | G06F 3/0631 |

FOREIGN PATENT DOCUMENTS

| | | |
|---|---|---|
| JP | 2002-297431 | 10/2002 |
| JP | 2008-146408 | 6/2008 |
| JP | 2010-522914 | 7/2010 |
| JP | 2010-282383 | 12/2010 |
| WO | 2008-116751 | 10/2008 |

* cited by examiner

*Primary Examiner* — Prasith Thammavong
(74) *Attorney, Agent, or Firm* — Fujitsu Patent Center

(57) ABSTRACT

A group generation unit 111 regards, as an invalid area, an area of a first storage medium in which data to be updated is stored and stores updated data in the first storage medium. A reorganization processing unit executes a process of selecting some first groups, calculating, for each of the selected first groups, the number of second storage media to be secured to store data that is stored in an area other than the invalid area of the first storage medium, securing the second storage media according to the levels of priority that are determined according to the calculated number, and transferring the data that is stored in the area other than the invalid area of the first storage medium to the second storage media. A volume management unit moves, to a second group, the first medium on which the transfer performed by the reorganization processing unit completes.

7 Claims, 17 Drawing Sheets

FIG.6

| STACKED PVG IDENTIFIER | PRIORITY LEVEL | PV SECURED CAPACITY | PV RETURNED CAPACITY | PV INCREASED CAPACITY | TIME OF OCCURRENCE | NUMBER OF PVS IN SCRATCH PVG |
|---|---|---|---|---|---|---|
| D | 1 | 1 | 2 | 1 | 10:03 | 3 |
| C | 2 | 1 | 1 | 0 | 10:05 | 3 |
| A | 3 | 2 | 3 | 1 | 10:01 | 4 |
| B | 4 | 2 | 2 | 0 | 10:02 | 4 |

| STACKED PVG IDENTIFIER | PV SECURED CAPACITY | PV RETURNED CAPACITY | PV INCREASED CAPACITY | TIME OF OCCURRENCE |
|---|---|---|---|---|
| A | 2 | 3 | 1 | 10:00 |
| B | 2 | 2 | 0 | 10:00 |
| C | 1 | 1 | 0 | 10:00 |
| D | 1 | 2 | 1 | 10:00 |
| E | 3 | 4 | 1 | 10:00 |

| STACKED PVG IDENTIFIER | PRIORITY LEVEL | PV SECURED CAPACITY | PV RETURNED CAPACITY | PV INCREASED CAPACITY | TIME OF OCCURRENCE | NUMBER OF PVS IN SCRATCH PVG |
|---|---|---|---|---|---|---|
| A | 1 | 2 | 3 | 1 | 10:00 | 3 |
| B | 2 | 2 | 2 | 0 | 10:00 | 3 |

| STACKED PVG IDENTIFIER | PRIORITY LEVEL | PV SECURED CAPACITY | PV RETURNED CAPACITY | PV INCREASED CAPACITY | TIME OF OCCURRENCE | NUMBER OF PVS IN SCRATCH PVG |
|---|---|---|---|---|---|---|
| C | 1 | 1 | 1 | 0 | 10:00 | 2 |
| A | 2 | 2 | 3 | 1 | 10:00 | 3 |
| B | 3 | 2 | 2 | 0 | 10:00 | 3 |

FIG.14

| STACKED PVG IDENTIFIER | PRIORITY LEVEL | PV SECURED CAPACITY | PV RETURNED CAPACITY | PV INCREASED CAPACITY | TIME OF OCCURRENCE | NUMBER OF PVS IN SCRATCH PVG |
|---|---|---|---|---|---|---|
| D | 1 | 1 | 2 | 1 | 10:00 | 3 |
| C | 2 | 1 | 1 | 0 | 10:00 | 3 |
| A | 3 | 2 | 3 | 1 | 10:00 | 4 |
| B | 4 | 2 | 2 | 0 | 10:00 | 4 |

FIG.15

| STACKED PVG IDENTIFIER | PRIORITY LEVEL | PV SECURED CAPACITY | PV RETURNED CAPACITY | PV INCREASED CAPACITY | TIME OF OCCURRENCE | NUMBER OF PVS IN SCRATCH PVG |
|---|---|---|---|---|---|---|
| D | 1 | 1 | 2 | 1 | 10:00 | 3 |
| C | 2 | 1 | 1 | 0 | 10:00 | 3 |
| A | 3 | 2 | 3 | 1 | 10:00 | 4 |
| B | 4 | 2 | 2 | 0 | 10:00 | 4 |
| E | 5 | 3 | 4 | 1 | 10:00 | 5 |

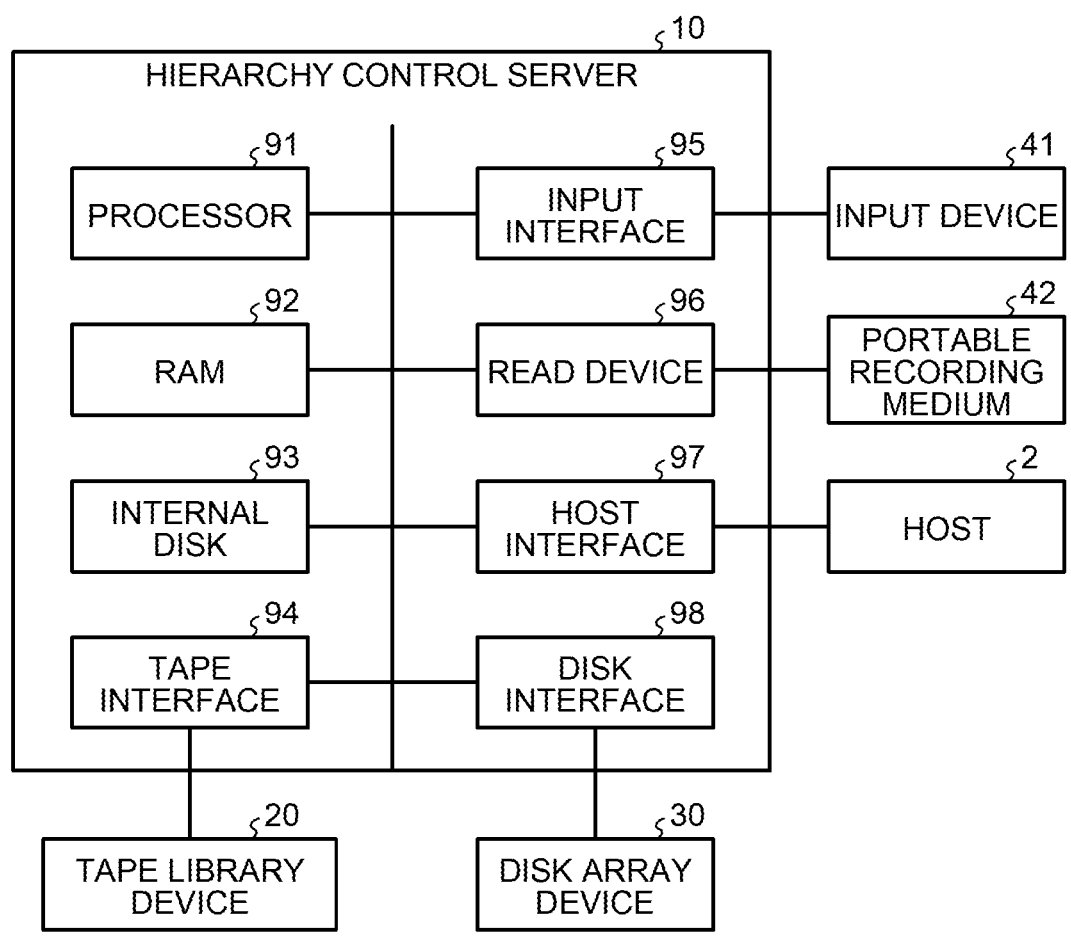

STORAGE DEVICE, COMPUTER READABLE RECORDING MEDIUM, AND STORAGE DEVICE CONTROL METHOD

CROSS-REFERENCE TO RELATED APPLICATIONS

This application is based upon and claims the benefit of priority of the prior Japanese Patent Application No. 2015-174124, filed on Sep. 3, 2015, the entire contents of which are incorporated herein by reference.

FIELD

The embodiment discussed herein is directed to a storage device, a computer readable recording medium, and a storage device control method.

BACKGROUND

A tape library device (LIB) that includes multiple recording media using magnetic tapes are widely used for use requiring a high-capacity storage for, for example, data backup for a host, such as a server. While magnetic tapes are advantageous in low costs and high storage capacity, the data access speed is lower than that of, for example, hard disk drives (HDD). For this reason, recently, hierarchical storage systems are used in each of which a disk array device including multiple HDDs is used as a cache mechanism (primary storage) and a tape library device having a much higher capacity is arranged at the backend (secondary storage). A hierarchical storage system can be referred to as a virtual tape library. A disk array device can be referred to as a tape volume cache (TVC). A tape medium can be referred to as a physical volume (PV).

Such a hierarchical storage system includes a hierarchy control server for controlling a disk array device and a tape library device. For example, when a data read request or a data write request is issued from a host, the hierarchy control server servers as a conventional tape library device for the host and writes or reads data by using the disk array device internally. The hierarchy control server regards a set of data acquired from a host as a logical volume (LV) and reads and writes the data to and from the disk array device. The hierarchy control server then saves, in a tape medium, the data that is written in the disk array device at the background not via the host. Specifically, the hierarchy control server saves, in a physical volume, i.e., a tape medium, a logical volume stored in the disk array device. The process of storing, in a physical volume, a logical volume in the disk array device can be referred to as "migration".

In order to prevent the capacity of the hierarchical storage system from lowering due to the logical volumes that are stored in the disk array device, the hierarchical storage system does not perform updating and deletes the large-capacity logical volume having been subjected to migration.

For hierarchical storage systems, there is a technology for grouping used physical volumes in which logical volumes are already stored to generate a group called a stacked physical volume group (PVG) and managing the group. Furthermore, for hierarchical storage systems, there is a technology for grouping physical volumes not in use in which no data is stored to generate a group called a scratch PVG and managing the group.

Operations of migration performed by the hierarchical storage system will be described in detail here. The state where the logical volume to be read or written by the host from or in the disk array device is already stored in the disk array device can be referred to as a logical volume of an on-cache. The state where the logical volume to be read and written by the host from and to the disk array device is not stored in the disk array device can be referred to as a cache miss. When the logical volume to be read and write by the host is an on-cache, the hierarchy control server reads the logical volume from the disk array device and makes a response to the host. On the other hand, when the logical volume to be read and write by the host is a cache miss, the hierarchy control server inserts the physical volume to which the logical volume has migrated to the tape drive of the tape library and reads the logical volume. After transferring the read logical volume into the disk array device, the hierarchy control server makes a response to the host.

Furthermore, the hierarchical storage system updates performs a logical volume update in which a logical volume having data that is updated according to migration is stored in a physical volume. In order to omit time-consuming processing, such as generation management, an operation may be performed in which the old logical volume before update is regarded as invalid logical volume and the area of the invalid logical volume is regarded as an invalid area. When this processing is performed, each time the logical volume is updated, the invalid area in the physical volume increases and the usable area in the physical volume decreases. When it is not possible to store logical volumes in the physical volume anymore, a new physical volume not in use is used. For example, when a stacked PVG and a scratch PVG are used and if, in the stacked PVG, there is no physical volume in which a logical volume can be stored, a physical volume to be used is moved from the scratch PVG to the stacked PVG. Accordingly, the number of physical volumes not in use decreases eventually.

There is therefore a technology called reorganization as a conventional technology for increasing the number of physical volumes not in use. In reorganization, when the number of physical volumes not in use in a tape library device becomes small, logical volumes are transferred from the used physical volume to a physical volume not in use in order to increase the number of physical volumes not in use. Moving the stored logical volumes causes the used physical volume to turn into an physical volume not in use. When a stacked PVG and a scratch PVG are used, the physical volume not in use generated by reorganization is returned to the scratch PVG.

Note that there is a conventional technology called garbage collection in which data excluding invalid data is recorded in a new magnetic tape. Furthermore, there is a conventional technology in which a random medium, such as a magnetic disk, is used as a virtual sequential access recording medium and, when the random medium stores unneeded data, invalidation processing is performed. Furthermore, there is another conventional technology in which volumes are automatically reorganized in an optical library.

Patent Document 1: Japanese National Publication of International Patent Application No. 2010-522914

Patent Document 2: Japanese Laid-open Patent Publication No. 2008-146408

Patent Document 3: Japanese Laid-open Patent Publication No. 2010-282383

Patent Document 4: Japanese Laid-open Patent Publication No. 2002-297431

However, reorganization on multiple stacked PVGs may be executed simultaneously. In such a case, the reorganization is executed according to the order in which the hierarchy control server accepts process requests. When reorganization is executed, depending on the volume of data stored in a physical volume that belongs to a stacked PVG, a new physical volume from a scratch PVG may be secured. For this reason, when multiple sets of reorganization are executed simultaneously, it is assumed that it is not possible to secure a physical volume to be used for the reorganization process depending on the processing procedure. In such a case, no reorganization is performed and accordingly migration of a logical volume stored in a TVC to a physical volume becomes difficult and thus there is a risk that the redundancy of data in the hierarchical storage system is not realized.

Even with the conventional technology using garbage collection, it is not possible to prevent a shortage of physical volumes when multiple sets of reorganization are processed simultaneously, which makes it difficult to maintain redundancy of data in the hierarchical storage system. Furthermore, even with the conventional technology using a magnetic disk or an optical library, a similar problem occurs, which makes it difficult to maintain redundancy of data in the hierarchical storage system.

SUMMARY

According to an aspect of an embodiment, a storage device includes: a plurality of storage media; a group management unit that manages a plurality of first groups to each of which a first storage medium in which data is stored among the storage media belongs and a second group to which a second storage medium in which no data is stored among the storage media belongs; a data storage unit that regards, as an invalid area, an area of the first storage medium in which data to be updated is stored and that stores, in the first storage medium, updated data from the data; a data transfer unit that executes a process of selecting some of the first groups, calculating, for each of the selected first groups, the number of the second storage media to be secured to store data that is stored in an area other than the invalid area of the first storage medium having the invalid area, securing the second storage media according to the levels of priority that are determined according to the number of the second storage media to be secured, and transferring the data that is stored in the area other than the invalid area of the first storage medium to the second storage media; and a moving unit that moves, to the second group, the first medium which belongs in the first group and on which the transfer performed by the data transfer unit completes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table of an exemplary priority-level table;
FIG. 10 is a table representing information on sets of reorganization that occur simultaneously;
FIG. 14 is a table representing the priority-level table at the stage when the level of priority of Reorganization D is determined;
FIG. 15 is a table representing the priority-level table at the stage when the level of priority of Reorganization E is determined;
FIG. 17 is a hardware configuration diagram of the hierarchy control server.

DESCRIPTION OF EMBODIMENTS

Preferred embodiments of the present invention will be explained with reference to accompanying drawings. The following embodiment does not limit the storage device, the computer readable recording medium, and the storage device control method disclosed herein.

Figure 1:
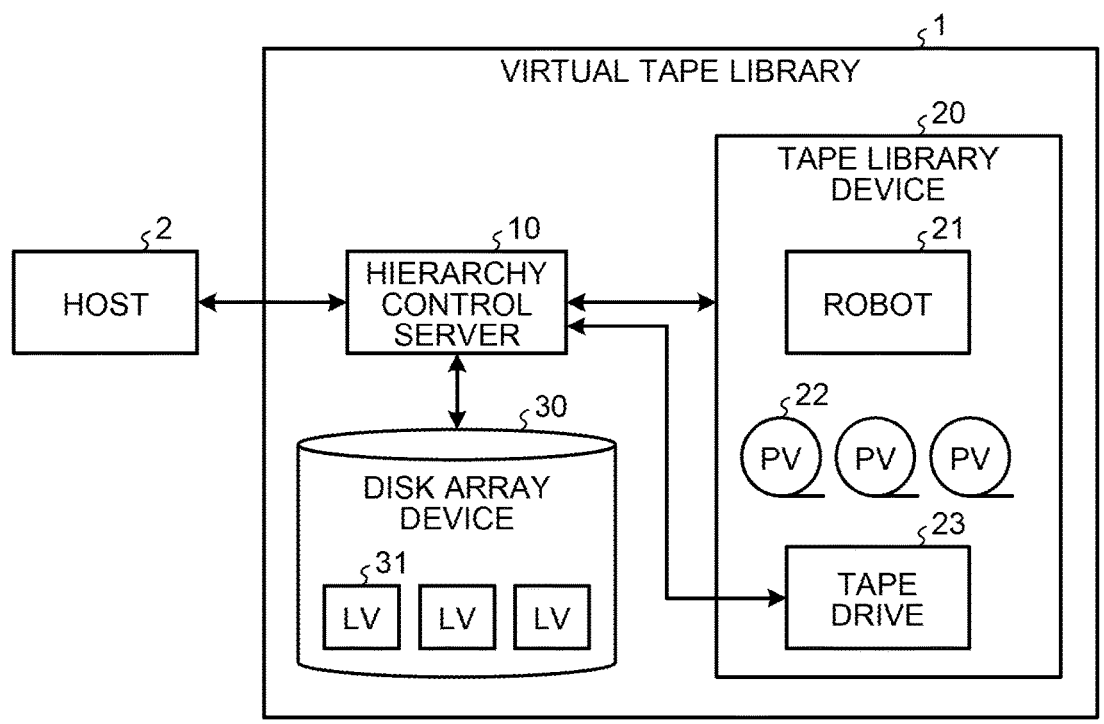
FIG. 1 is a configuration diagram of a storage system according to an embodiment of the invention.

FIG. 1 is a configuration diagram of a storage system according to the embodiment. As illustrated in FIG. 1, in the storage system according to the embodiment, a virtual tape library 1 is connected to a host 2. The host 2 is an information processing device, such as a server.

The virtual tape library 1 includes a hierarchy control server 10, a tape library device 20, and a disk array device 30. Specifically, the hierarchy control server 10 is connected to the host 2. The hierarchy control server 10 is connected to the tape library device 20 and the disk array device 30.

The disk array device 30 has a storage medium enabling high-speed reading and writing compared to a high-capacity storage device, such as a tape. For example, the disk array device 30 includes, for example, a hard disk. The disk array device 30 stores logical volumes (LVs) in its own storage medium.

The tape library device 20 includes a robot 21, a physical volume (PV) 22 and a tape drive 23. The physical volume 22 is a high-capacity storage medium, such as a magnetic tape. The tape library device 20 includes multiple physical volumes 22.

The robot 21 transfers the physical volumes 22. For example, upon accepting a write or read instruction from the hierarchy control server 10, the robot 21 inserts a physical volume 22 that is specified into the tape drive 23. Thereafter, when the tape drive 23 ends the process of to writing/reading data in/from the physical volume 22, the robot 21 takes the physical volume 22 out of the tape drive 23 and returns the physical volume 22 to the storage.

The tape drive 23 writes/reads data in/from the inserted physical volume 22 according to the instruction from the hierarchy control server 10.

Figure 2:
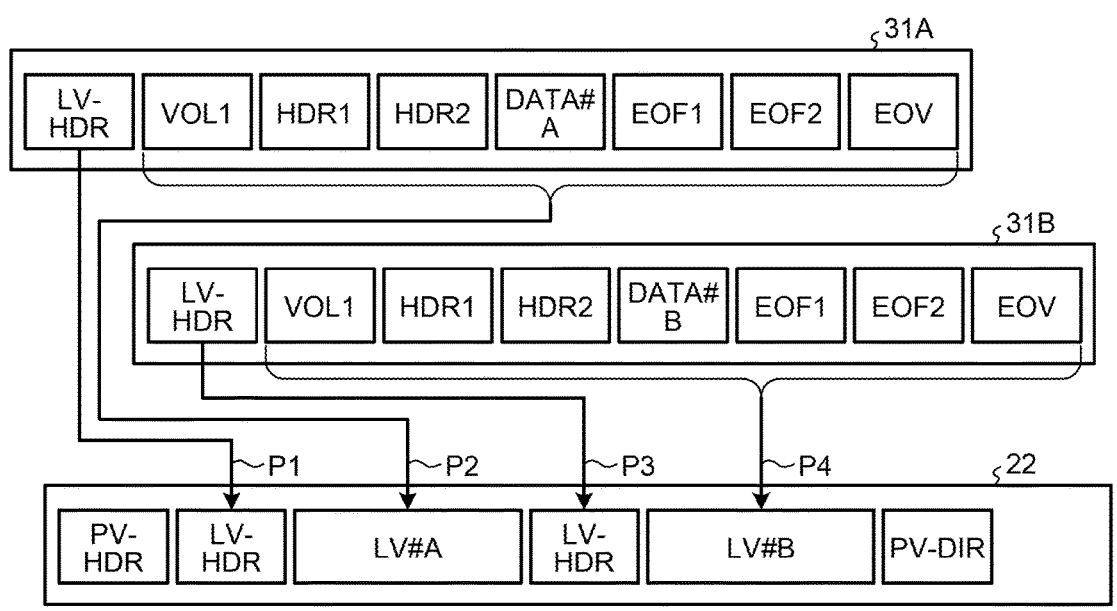
FIG. 2 is a schematic diagram representing the format of a physical volume.

The format of the physical volume 22 will be described here. FIG. 2 is a schematic diagram representing the format of a physical volume. The case where logical volumes 31A and 31B are stored in a physical volume 22 will be described here. It is assumed that the logical volume 31A is stored firstly and then the logical volume 31B is stored.

The logical volume 31A includes a logical volume header (LV-HDR), a volume (VOL), a HDR1, HDR2, data#A, an EOF (end of file) 1, a EOF2, and an EOV (end of volume). Regarding the logical volume 31B, the DATA#A in the logical volume 31A is replaced with DATA#B and the rest of information has the same format as that of the logical volume 31A. The block of the LV-HDR is a block in which a generation representing the number of times the logical volume 31 is updated, a logical volume name, a logical volume group name, a logical volume size, and a logical volume creation date are stored. The block of the VOL1 is a block of 80 bytes in which information, such as a volume name and an owner, is stored. The block of the HDR1 is a block of 80 bytes in which, for example, a file name and an update date are stored. The block of the HDR2 is a block of 80 bytes in which, for example, a recording form and a block length are stored. The blocks of the Data#A and Data#B are blocks of variable byte length in which user data is stored. The block of the EOF1 is a block of 80 bytes in which, for example, a file name and an update date are stored. The block of the EOV is a mark block representing the end of the volume.

At the top of the physical volume 22, a PV-HDR is stored. In the PV-HDR, a standard identifier, a physical volume name, and a group name of a group to which the physical volume 22 belongs are stored. In the PV-HDR, the identifier of the virtual tape library device and the status of the physical volume 22 are stored. The group to which the physical volume 22 belongs will be described in detail below. Following the PV-HDR, as represented by the arrow P1, the LV-HDR of the logical volume 31A that is stored firstly is stored. Following this, as represented by the arrow P2, the VOL1, the HDR1, the HDR2, the DATA#A, the EOF1, the EOF2 and the EOV of the logical volume 31A are stored as a LVA as a set of data of the logical volume. Following this, as represented by the arrow P3, the LV-HDR of the logical volume 31B that is stored secondarily is stored. Following this, as represented by the arrow P4, the VOL1, the HDR1, the HDR2, the DATA#B, the EOF1, the EOF2 and the EOV of the logical volume 31B are stored as LV#M as the a set of data of the logical volume. A PV-DIR (directory) is stored in the physical volume 22 at the end. In the PV-DIR, for example, a list of logical volumes and information representing the end are stored. As descried above, the logical volumes 31 are stored in the physical volume 22 to be connected sequentially according to the order in which they are written.

FIG. 1 will be referred back here. The hierarchy control server 10 receives an instruction for writing data from the host 2. Upon receiving the instruction for writing data, the hierarchy control server 10 writes a specified set of data as a logical volume 31 in the disk array device 30. The hierarchy control server 10 then makes a response to the host 2. The hierarchy control server 10 then performs migration. Specifically, the hierarchy control server 10 reads the logical volume 31 stored in the disk array device 30, issues an instruction for writing the data that is read in a physical volume 22 to the tape library device 20 to store the data in the physical volume 22.

Upon receiving an instruction for reading data, the hierarchy control server 10 determines whether there is a logical volume 31 in which the data to be read is stored in the disk array device 30. When the logical volume 31 in which the data to be read is stored is in the disk array device 30, the hierarchy control server 10 reads the logical volume 31 from the disk array device 30. The hierarchy control server 10 then sends back the read data to the host 2.

When there is not the logical volume 31 in which the data to be read is stored in the disk array device 30, the hierarchy control server 10 issues an instruction for reading the logical volume 31 to the tape library device 20. Thereafter, the hierarchy control server 10 acquires, from the tape library device 20, the logical volume 31 read from a physical volume 22. The hierarchy control server 10 then sends back the data that is stored in the acquired logical volume 31 to the host 2 and stores the acquired logical volume 31 in the disk array device 30.

Upon accepting an instruction for deleting data from the host 2, the hierarchy control server 10 deletes a logical volume 31 that is stored in the disk array device 30 and a physical volume 22.

When an invalid area in the physical volume 22 in which invalid logical volumes 31 are stored increases, the hierarchy control server 10 performs reorganization in which valid areas in which valid logical volumes 31 are stored are transferred to another physical volume 22 and grouped to increase the use area. When a logical volume 31 is valid, an updated logical volume 31 corresponding to the logical volume 31 is not stored or the logical volume 31 is not deleted.

Regarding reorganization, the hierarchy control server 10 performs reorganization when the sum of the invalid area and the area not in use is equal to or larger than the capacity of one physical volume 22.

Furthermore, when multiple sets of execution of reorganization occur concurrently, the hierarchy control server 10 sorts the sets of reorganization according to the secured capacities of physical volumes 22 each of which is the volume of physical volumes 22 to be secured to perform reorganization. Regarding sets of reorganization with equal volumes of physical volumes 22 to be secured, the hierarchy control server 10 sorts the sets of reorganization according to the volumes of physical volumes 22 not in use generated when reorganization is executed. The volume of physical volumes 22 not in use generated when reorganization is executed is referred to as the "increased capacity corresponding to the physical volumes 22 not in use". Regarding sets of reorganization whose increased capacities of physical volumes 22 are equal to each other, the hierarchy control server 10 sorts the sets of reorganization according to the order of times of occurrence of reorganization.

The hierarchy control server 10 then executes the sets of reorganization according to the sort order. Regarding a set of reorganization that is added subsequently, the hierarchy control server 10 determines, according to the above-described condition, a position between the sorted sets of reorganization at which the added set of reorganization is to be inserted and inserts the set of reorganization according to the determined order.

Figure 3:
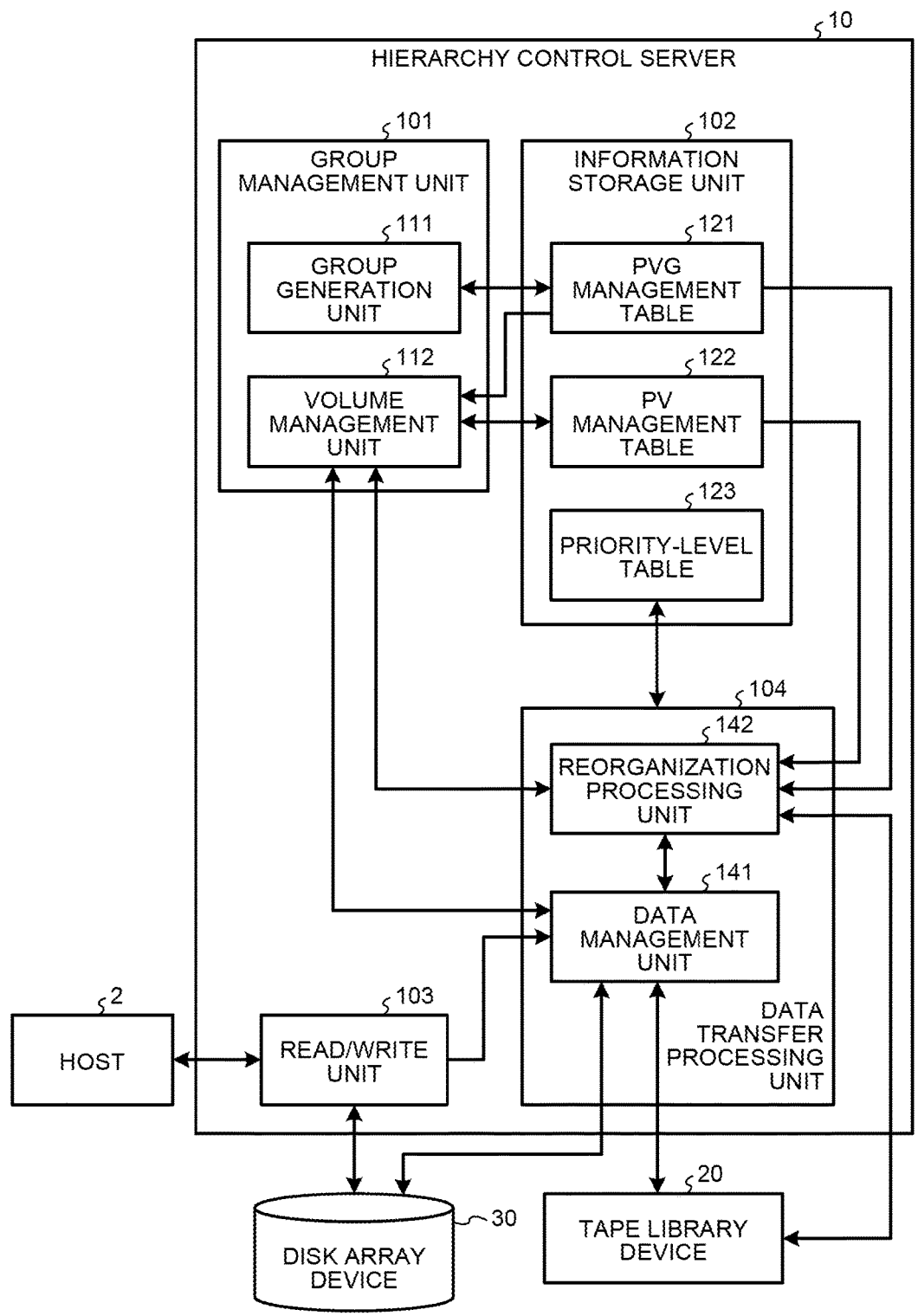
FIG. 3 is a block diagram of a hierarchy control server.

With reference to FIG. 3, the hierarchy control server 10 will be described in detail. FIG. 3 is a block diagram of the hierarchy control server. As illustrated in FIG. 3, the hierarchy control server 10 includes a group management unit 101, an information storage unit 102, a read/write unit 103, and a data transfer processing unit 104.

The information storage unit 102 includes a storage area in which the information of a PVG management table 121, the information of a PV management table 122, and the information of a priority-level table 123 are stored. The PVG management table 121, the PV management table 122, and the priority-level table 123 will be described in detail below.

The read/write unit 103 receives a data read command or a data write command from the host 2. Upon receiving a data write command, the read/write unit 103 stores data as a logical volume 31 in the disk array device 30. Here, when the host 2 issues an instruction for creating a logical volume group, the read/write unit 103 generates a logical volume group in the disk array device 30. When a logical volume group is specified as one in which data is to be written according to a write command, the read/write unit 103 stores a logical volume 31 such that the logical volume 31 belongs to the specified logical volume group in the disk array device 30. The read/write unit 103 then notifies the data transfer processing unit 104 of the storing of the logical volume 31.

Upon receiving a read instruction, the read/write unit 103 determines whether data that is specified is in the disk array device 30. When the specified data is in the disk array device 30, the read/write unit 103 acquires the specified data by reading it from the disk array device 30. On the other hand, when the specified data is not in the disk array device 30, the read/write unit 103 issues a request for reading the specified data to a data management unit 141 of the data transfer processing unit 104, which will be described below. The read/write unit 103 then acquires the specified data from the data management unit 141. The read/write unit 103 then transmits the acquired data to the host 2.

Furthermore, the read/write unit 103 receives an instruction for deleting a logical volume 31 from the host 2. In this case, the read/write unit 103 deletes a logical volume 31 that is specified from the disk array device 30. Furthermore, the read/write unit 103 issues an instruction for deleting the logical volume 31 to the data transfer processing unit 104.

The group management unit 101 includes a group generation unit 111 and a volume management unit 112.

The group generation unit 111 creates a group by grouping physical volumes 22 in use that the tape library device 20 includes and creates a group by grouping physical volumes 22 not in use. A physical volume 22 in use is a physical volume in which a valid physical volume 31 is already stored. A physical volume 22 not in use is a physical volume in which no valid physical volume is stored. The group of physical volumes 22 in use is referred to as a "stacked PVG". The stacked PVG is an exemplary "first group". The group of physical volumes 22 not in use is referred to as a "scratch PVG". The scratch PVG" is an exemplary "second group".

The group generation unit 111 generates at least one stacked PVG. The group generation unit 111 generates at least one scratch PVG.

Figure 4:
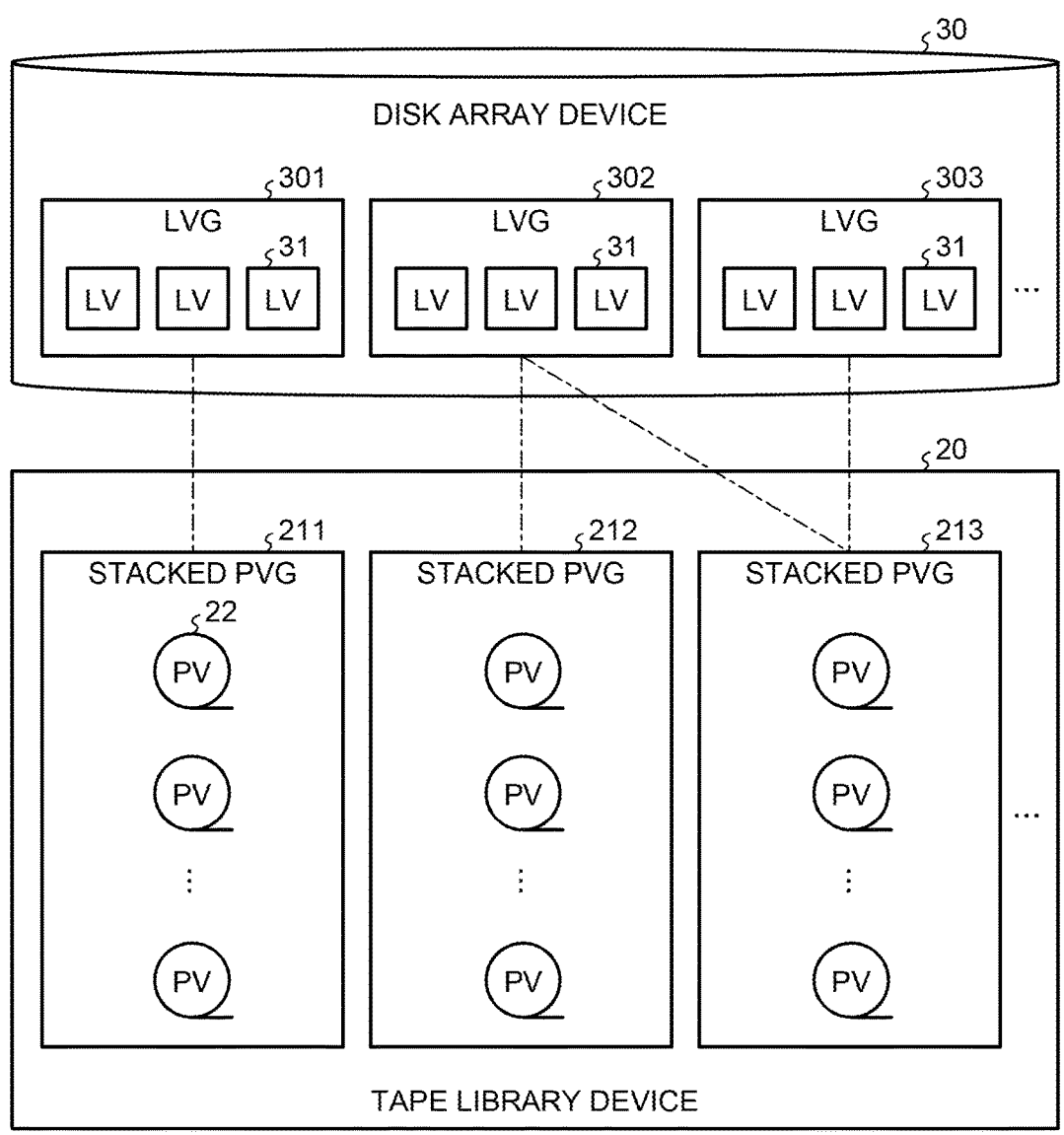
FIG. 4 is a diagram of exemplary stacked PVGs.

FIG. 4 is a diagram of exemplary stacked PVGs. For example, the disk array device 30 stores logical volume groups including logical volume groups (LVGs) 301 to 303. Each of the logical volume groups 301 to 303 includes multiple logical volumes 31.

The group generation unit 111 generates stacked PVGs including stacked PVGs 211 to 213. When the stacked PVGs 211 to 213 are not particularly distinguished, they will be referred to as the "stacked PVGs 210" below. At least one physical volume 22 belongs to one stacked PVG 210. The group generation unit 111 associates at least one stacked PVG 210 with the logical volume groups 301 to 303. The dashed lines in FIG. 4 represent association between the logical volume groups 301 to 303 and the stacked PVGs 211 to 213. The group generation unit 111 associates the stacked PVG 211 with the logical volume group 301. The group generation unit 111 associates the stacked PVGs 212 and 213 with the logical volume group 302. The group generation unit 111 further associates the stacked PVG 213 with the logical volume group 303. Between the logical volume groups and the stacked PVGs that are associated as described above, the process of storing a logical volume 31 in a physical volume 22 and the process of reading a logical volume 31 stored in a physical volume 22 and storing the logical volume 31 in the disk array device 30 are performed.

Figure 5:
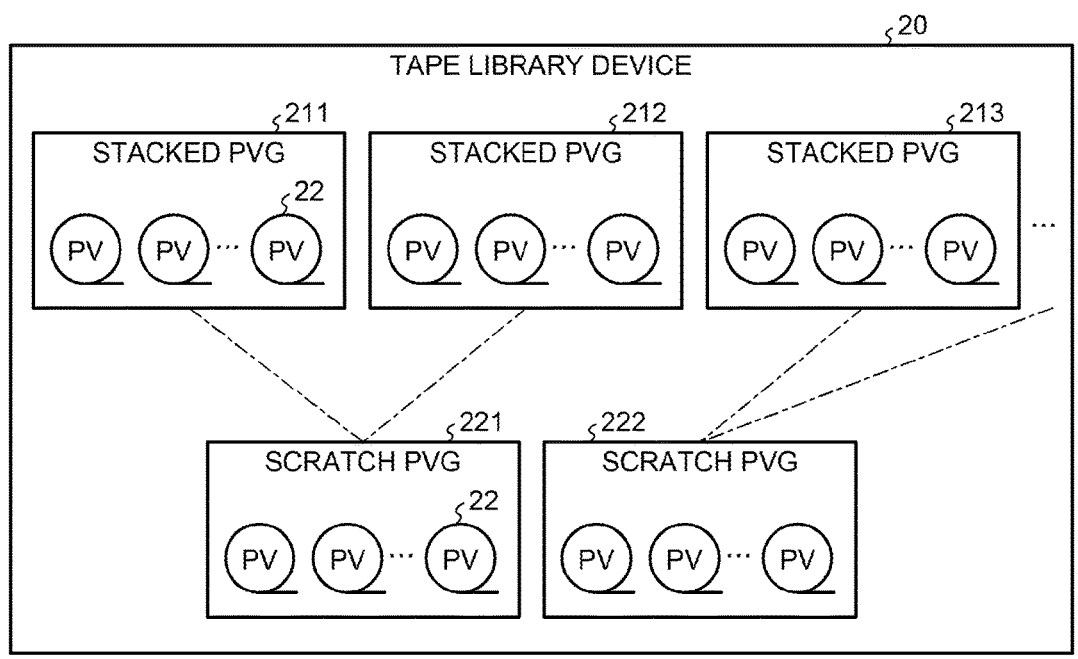
FIG. 5 is a diagram illustrating association between stacked PVGs and scratch PVGs.

Furthermore, the group generation unit 111 associates at least one stacked PVG 210 with a generated scratch PVG. For example, as illustrated in FIG. 5, the group generation unit 111 associates stacked PVGs 211 to 213 with scratch PVGs 221 and 222. FIG. 5 illustrates association between stacked PVGs and scratch PVGs. When the scratch PVGs 221 to 222 are not particularly distinguished, they will be referred to as the "scratch PVGs 220" below.

Each stacked PVG 210 is able to use the physical volumes 22 that belongs to the scratch PVG 220 with which the stacked PVG 210 is associated. In other words, in response to a request for a physical volume 22 from a stacked PVG 210, the associated scratch PVG 220 is able to provide the physical volume 22. Associating multiple stacked PVGs 210 with one scratch PVG 220 as described above makes it possible to run the physical volumes 22 efficiently.

FIG. 3 will be referred back here to continue descriptions. Using the PVG management table 121, the group generation unit 111 manages the information on the stacked PVGs 210, the information on the scratch PVGs 220, and information on association between them. The group generation unit 111 registers, in the PVG management table 121, the information on the associated scratch PVG 220 in association with the identifier of each physical volume group (PVG). Furthermore, the group generation unit 111 registers, in the PVG management table 121, the information on the tape library device 20 that is stored in each physical volume group and the number of physical volumes 22 that belong to the physical volume group. Furthermore, the group generation unit 111 registers, in the PVG management table 121, a condition on starting execution of reorganization in each physical volume group. The group generation unit 111 stores the information of the generated PVG management table 121 in the information storage unit 102.

Using the PV management table 122, the volume management unit 112 manages the logical volume(s) 31 that is stored in each physical volume 22.

The volume management unit 112 registers, in the PV management table 122, the tape library device 20 in which each physical volume 22 is stored, the information on the physical volume group to which each physical volume 22 belongs, the state of use, and the number of stored logical volumes. The volume management unit 112 further registers, in the PV management table 122, the number of valid logical volumes and a valid LV ratio that is the ratio of valid logical volumes. The state of use represents, for example, whether the physical volume 22 is not in use, is in use, is being subjected to writing, is being subjected to reading, has a medium error, or is not accessible. When the physical volume 22 is not accessible or has a medium error, it is not possible to use the physical volume 22. A physical volume 22 being subjected to writing or reading is represented by an in-use mode.

Once the data transfer processing unit 104 starts writing data in a physical volume 22, the volume management unit 112 changes the state of the physical volume 22 in which the data is written in the PV management table 122 into a state of being subjected to writing. After the data transfer processing unit 104 completes the writing, the volume management unit 112 changes the state of the physical volume 22 in which the data is written into a state of being in use.

Once the data transfer processing unit 104 starts reading data from a physical volume 22, the volume management unit 112 changes the state of the physical volume 22 from which the data is read in the PV management table 122 into a state of being subjected to reading. After the data transfer processing unit 104 completes the reading, the volume management unit 112 changes the state of the physical volume 22 from which the data is read into a state of being in use.

When the data transfer processing unit 104 deletes a logical volume 31, the volume management unit 112 acquires, from the data management unit 141, the information on the deleted logical volume 31 and the information on the physical volume 22 from which the logical volume 31 is deleted. The volume management unit 112 updates, regarding the logical volumes 31 that are stored in the physical volume 22 from which the logical volume 31 is deleted, the number of logical volumes 31, the number of valid logical volumes 31, and the ratio of valid logical volumes 31 in the PV management table 122.

When there is a physical volume 22 without any valid logical volume 31 due to deletion, the volume management unit 112 specifies the physical volume 22 from the PV management table 122. The volume management unit 112 then changes the group to which the specified physical volume 22 belongs from a stacked PVG 210 to a scratch PVG 220 in the PV management table 122. Accordingly, the volume management unit 112 moves the specified physical volume 22 from the stacked PVG 210 to the specified scratch PVG 220.

To secure a physical volume 22 to execute migration, the volume management unit 112 receives, from the data management unit 141, an instruction for securing physical volumes 22 together with the number of physical volumes 22 to be secured. The volume management unit 112 selects the specified number of physical volumes 22 that belong to a scratch PVG 220 from the PV management table 122. The volume management unit 112 then changes the group to which the selected physical volumes 22 belong in the PV management table 122 from the scratch PVG 220 to a staked PVG 210. Accordingly, the volume management unit 112 moves the selected physical volumes 22 from the scratch PVG 220 to the stacked PVG 210. The volume management unit 112 then notifies the data management unit 141 of the completion of moving the physical volumes 22 to the stacked PVG 210.

To execute reorganization, the volume management unit 112 receives, from a reorganization processing unit 142, an instruction for securing physical volumes 22 together with the number of physical volumes 22 to be secured. The volume management unit 112 selects the specified number of physical volumes 22 that belong to a scratch PVG 220 from the PV management table 122. The volume management unit 112 then changes the group to which the selected physical volumes 22 belong in the PV management table 122 from the scratch PVG 220 to a staked PVG 210. Accordingly, the volume management unit 112 moves the selected physical volumes 22 from the scratch PVG 220 to the stacked PVG 210. The volume management unit 112 then notifies the reorganization processing unit 142 of the completion of the moving the physical volumes 22 to the stacked PVG 210.

When the data transfer processing unit 104 completes migration and reorganization, the volume management unit 112 acquires the information on the logical volume 31 to be processed from the data transfer processing unit 104. Furthermore, the volume management unit 112 receives the information on the physical volume 22 from which the logical volume 31 to be processed is moved and the physical volume 22 to which the logical volume 31 is moved from the data transfer processing unit 104.

The volume management unit 112 then updates, regarding the logical volumes 31 that are stored in the physical volume 22 to which the logical volume 31 is moved, the number of logical volumes 31, the number of valid logical volumes 31, and the ratio of valid logical volumes 31 in the PV management table 122. Furthermore, the volume management unit 112 changes the state of the physical volume 22 in which data is written in the PV management table 122 to a state of being in use.

Furthermore, the volume management unit 112 updates, regarding the logical volumes 31 that are stored in the physical volume 22 from which the logical volume 31 is moved, the number of logical volumes 31, the number of valid logical volumes 31, and the ratio of valid logical volumes 31 in the PV management table 122.

When a valid logical volume 31 is stored in the physical volume 22 from which the logical volume 31 is moved, the volume management unit 112 changes the state of the physical volume 22 from which the logical volume 31 is moved to a state of being in use.

On the other hand, when not any valid logical volume 31 is stored in the physical volume 22, the volume management unit 112 changes the state of the physical volume 22 from which the logical volume 31 is moved to a state of being not in use. The volume management unit 112 then specifies the scratch PVG 220 corresponding to the stacked PVG 210 to which the physical volume 22 from which the logical volume 31 is moved belongs from the PVG management table 121. The volume management unit 112 then changes the group to which the physical volume 22 from which the logical volume 31 is moved belongs to the specified scratch PVG 220. Accordingly, the volume management unit 112 moves the physical volume 22 from which the logical volume 31 is moved from the stacked PVG 210 to the specified scratch PVG 220. The volume management unit 112 serves as an exemplary "moving unit".

The data transfer processing unit 104 includes the data management unit 141 and the reorganization processing unit 142. The data management unit 141 performs, for example, migration, deletion of a logical volume 31, and writing of a logical volume 31 in the disk array device 30. The reorganization processing unit 142 executes reorganization.

Upon receiving a notification representing that a logical volume 31 has been stored from the read/write unit 103, the data management unit 141 stores, in a physical volume 22, the logical volume 31 stored in the disk array device 30. The data management unit 141 determines whether it is possible to store the logical volume 31 in an existing physical volume 22 that belongs to a stacked PVG 210 to which the logical volume 31 is to migrate. When it is possible to store the logical volume 31 in the existing physical volume 22, the data management unit 141 executes migration. Specifically, the data transfer processing unit 104 acquires the logical volume 31 subjected to migration from the disk array device 30 and stores the logical volume 31 in the physical volume 22 of the stacked PVG 210 to which the logical volume 31 is to migrate.

On the other hand, when it is not possible to store the logical volume 31 in the existing physical volume 22, the data management unit 141 calculates the number of disks to be secured to perform migration. The data management unit 141 then notifies the volume management unit 112 of the calculated number of disks to be secured to perform migration. The data management unit 141 then receives a notification representing completion of securing a physical volume 22 from the volume management unit 112. The data management unit 141 then executes migration.

After executing migration the data management unit 141 notifies the volume management unit 112 of the information on the logical volume 31 that is moved by migration, and the information of the physical volume 22 to which the logical volume 31 is moved. Furthermore, the data management unit 141 notifies the reorganization processing unit 142 of the execution of migration and information on the stacked PVG 210 to which the physical volume 22 subjected to migration belongs.

Upon receiving an instruction for deleting a logical volume 31 from the read/write unit 103, the data management unit 141 deletes the specified logical volume 31 from a physical volume 22. After deleting the logical volume 31, the data management unit 141 notifies the volume management unit 112 of information on the deleted logical volume 31 and information on the physical volume 22 to which the logical volume 31 belongs. Furthermore, the data management unit 142 of the deletion and information on the stacked PVG 210 to which the physical volume 22 from which the logical volume 31 is deleted belongs. The data management unit 141 serves as an exemplary "data storage unit".

The reorganization processing unit 142 receives a notification representing execution of migration or a notification representing deletion of a logical volume 31 together with information on a stacked PVG 210 from the data management unit 141. The reorganization processing unit 142 acquires, from the PVG management table 121, the condition on execution of reorganization in the physical volume group corresponding to the stacked PVG 210 represented by the notification. The condition on execution of reorganization includes conditions of storage capacity, such as a soft minimum condition, a hard minimum condition, and an absolute minimum condition. The soft minimum condition corresponds to the case where the storage capacity of usable physical volumes 22 is under a given threshold and the ratio of valid logical volumes 31 is below a standard ratio of valid logical volumes 31. Furthermore, the hard minimum condition corresponds to the case where the storage capacity of usable physical volumes 22 is under a given threshold smaller than the threshold of the soft minimum condition. The absolute minimum condition corresponds to the case where the storage capacity of usable physical volumes 22 is under a given threshold smaller than the threshold of the hard minimum condition. For example, the threshold of the absolute minimum condition is set at a value under which it can be determined that there is no physical volume 22 for executing migration.

The reorganization processing unit 142 acquires, from the PV management table 122, the state of the physical volume 22 that belongs to the stacked PVG 210 represented by the notification. Using the acquired information, the reorganization processing unit 142 then determines whether the stacked PVG 210 satisfies the condition on execution of reorganization. The condition on reorganization serves as an exemplary "given condition".

When the stacked PVG 210 satisfies the condition on execution of reorganization, the reorganization processing unit 142 determines to execute reorganization on the stacked PVG 210. The stacked PVG on which it is determined to execute reorganization will be referred to as the "subject stacked PVG". The reorganization on the subject stacked PVG will be referred to as the "subject reorganization". Selecting the subject stacked PVG by the reorganization processing unit 142 serves as exemplary "selecting some first groups".

The reorganization processing unit 142 acquires, from the information storage unit 102, the priority-level table 123, like that represented in FIG. 6, representing the levels of priority of sets of reorganization that are already determined to be executed. FIG. 6 is a table of an exemplary priority-level table.

A stacked PVG identifier is identifying information on a stacked PVG 210 to be subjected to reorganization. The level of priority is the level of priority to perform reorganization. A PV secured capacity is the number of physical volumes 22 to be secured from a scratch PVG 220 to a stacked PVG 210 to perform reorganization. The PV secured capacity to perform a specific set of reorganization will be referred to as the "PV secured capacity of the specific set of reorganization". A PV returned capacity is the number of physical volumes 22 that can be returned from a stacked PVG 210 to a scratch PVG 220 as a result of reorganization. The PV returned capacity that occurs when the specific set of reorganization is performed will be referred to as the "returned capacity of the specific set of reorganization". A PV increased capacity is the increased number of physical volumes in a scratch PVG 220 when reorganization is performed and corresponds to the difference between the PV returned capacity and the PV secured capacity. The PV increased capacity in the case where a specific set of reorganization is performed will be referred to as the "increased capacity of the specific set of reorganization". A time of occurrence is the time at which the reorganization processing unit 142 determines to execute reorganization. The number of remaining PVs in a scratch PVG 220 is the number of physical volumes 22 existing in the scratch PVG 220 after execution of reorganization.

When there is not any set of reorganization that is already determined to be executed, or when there is no t any set of reorganization waiting to be executed, the priority-level table 123 enters a state where no set of reorganization is registered. The set of reorganization that is currently executed and a set of reorganization that is already executed are deleted from the priority-level table 123.

Upon determining to execution subject reorganization, the reorganization processing unit 142 calculates the PV secured capacity, the PV returned capacity, and the PV increased capacity of the subject reorganization. Furthermore, with reference to the priority-level table 123, the reorganization processing unit 142 determines whether there is a set of reorganization waiting to be executed.

When there is no set of reorganization waiting to be executed and there is no set of reorganization that is being executed, the reorganization processing unit 142 starts executing the subject reorganization.

When there is no set of reorganization waiting to be executed but there is a set of reorganization that is being executed, the reorganization processing unit 142 registers the set of reorganization on the subject stacked PVG in the priority-level table 123. In this case, the reorganization processing unit 142 registers the subject reorganization as a set of reorganization with the highest level of priority.

On the other hand, when there is a set of reorganization waiting to be executed, the reorganization processing unit 142 obtains the level of priority of the subject reorganization in the following manner. The reorganization processing unit 142 registers the subject reorganization in the priority-level table according to the determined level of priority and decrements by one the levels of priority of the sets of reorganization under the determined level of priority. The procedure of determining the level of priority performed by the reorganization processing unit 142 will be described below. The reorganization processing unit 142 selects a set of reorganization to be compared according to the descending order of the levels of priority and repeats the following process until the level of priority of the subject reorganization is determined. The set of reorganization selected to be compared will be referred to as the "selected reorganization" below.

The reorganization processing unit 142 determines whether the PV secured capacity of the subject reorganization is larger than the PV secured capacity of the selected reorganization. When the PV secured capacity of the subject reorganization is larger than the PV secured capacity of the selected reorganization, the reorganization processing unit 142 moves to comparison with a set of reorganization with the next highest level of priority.

On the other hand, when the PV secured capacity of the subject reorganization is equal to or smaller than the PV secured capacity of the selected reorganization, the reorganization processing unit 142 determines whether the PV secured capacity of the subject reorganization is smaller than the PV secured capacity of the selected reorganization. When the PV secured capacity of the subject reorganization is smaller than the PV secured capacity of the selected reorganization, the reorganization processing unit 142 sets the level of priority of the subject reorganization at the level of priority of the selected reorganization. Furthermore, the reorganization processing unit 142 decrements by one the levels of priority of sets of reorganization whose levels of priority are equal to or lower than that of the selected reorganization.

On the other hand, when the PV secured capacities of the subject reorganization and the selected reorganization match, the reorganization processing unit 142 determines whether the PV returned capacity of the subject reorganization is larger than the PV returned capacity of the selected reorganization. When the PV returned capacity of the subject reorganization is larger than the PV returned capacity of the selected reorganization, the reorganization processing unit 142 sets the level priority of the subject reorganization at the level of priority of the selected reorganization. Furthermore, the reorganization processing unit 142 decrements by one the levels of priority of sets of reorganization whose levels of priority are equal to or lower than that of the selected reorganization.

On the other hand, when the PV returned capacity of the subject reorganization is smaller than the PV returned capacity of the selected reorganization, the reorganization processing unit 142 moves to comparison with the reorganization with the next highest level of priority.

On the other hand, when the PV returned capacities of the subject reorganization and the selected reorganization match, the reorganization processing unit 142 determines whether the time of occurrence of the subject reorganization is at or before the time of occurrence of the selected reorganization. The time of occurrence refers to the timing at which the reorganization processing unit 142 determines that a stacked PVG 210 subjected to reorganization satisfies the condition on reorganization. When the time of occurrence of the subject reorganization is at or before the time of occurrence of the selected reorganization, the reorganization processing unit 142 sets the level of priority of the subject reorganization at the level of priority of the selected reorganization. Furthermore, the reorganization processing unit 142 decrements by one the levels of priority of sets of reorganization whose levels of priority are equal to or lower than that of the selected reorganization.

On the other hand, when the time of occurrence of the subject reorganization is after the time of occurrence of the selected reorganization, the reorganization processing unit 142 moves to comparison with the reorganization with the next highest level of priority.

Note that, when the level of priority of the subject reorganization is not determined after the comparison with all sets of reorganization that are already registered in the priority-level table 123, the reorganization processing unit 142 determines the level of priority of the subject reorganization as the lowest level of priority. The reorganization processing unit 142 then registers the level priority of the subject reorganization as the lowest level of priority in the priority-level table 123.

Upon completing the set of reorganization being executed, the reorganization processing unit 142 executes a set of reorganization with the highest level of priority among the priority-level table 123. The reorganization processing unit 142 serves as an exemplary "data transfer unit".

The reorganization processing unit 142 executes sets of reorganization according to the ascending order of PV secured capacities. The number of physical volumes 22 existing in a scratch PVG 220 gradually increases as reorganization is performed. This increases the possibility that the number of physical volumes 22 existing in the scratch PVG 220 is larger than the PV secured capacity, which increases the possibility that the state where reorganization is not executed can be prevented. In other words, the reorganization processing unit 142 executes sets of reorganization according to the ascending order of PV secured capacities, which improves continuity of reorganization and accordingly improves continuity of migration.

Figure 7:
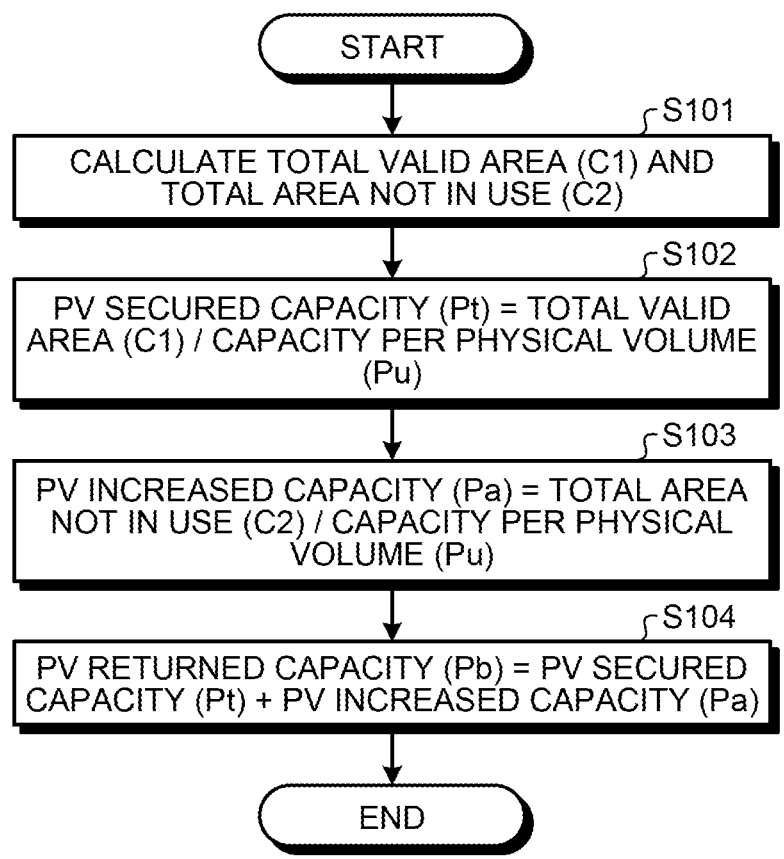
FIG. 7 is a flowchart of calculation of a PV secured capacity, a PV returned capacity, and a PV increased capacity.

With reference to FIG. 7, the flow of calculation of a PV secured capacity, a PV returned capacity, and a PV increased capacity will be described here. FIG. 7 is a flowchart of calculation of a PV secured capacity, a PV returned capacity, and a PV increased capacity. An example where the subject stacked PVG is the subject of the calculation will be described below.

The reorganization processing unit 142 specifies physical volumes 22 that belong to a subject stacked PVG from the PV management table 122. The reorganization processing unit 142 obtains the size of the area of a valid logical volume 31 in each specified physical volume 22.

The reorganization processing unit 142 then calculates a total valid area (C1) that is the total area of the valid logical volumes 31 in all physical volumes 22 that belong to the subject stacked PVG. Furthermore, the reorganization processing unit 142 then calculates a total area not in use (C2) that is the total of the area of the invalid logical volumes 31 and the area not in use in all the physical volumes 22 that belong to the subject stacked PVG (step S101). The total valid area is represented by "C1" and the total area not in use is represented by "C2".

The reorganization processing unit 142 divides the total valid area (C1) by the capacity (Pu) per physical volume 22 to calculate the PV secured capacity (Pt) of the subject reorganization (step S102). The capacity per physical volume 22 is represented by "Pu" and the PV secured capacity is represented by "Pt".

The reorganization processing unit 142 then divides the total area not in use (C2) by the volume (Pu) per physical volume 22 to calculate the PV increased capacity (Pa) of the subject reorganization (step S103). The PV increased capacity is represented by "Pa".

The reorganization processing unit 142 then adds the PC increased capacity (Pa) to the PV secured capacity (Pt) to calculate the PV returned capacity (Pb) of the subject reorganization (step S104). The PV returned capacity is represented by "Pb".

Figure 8:
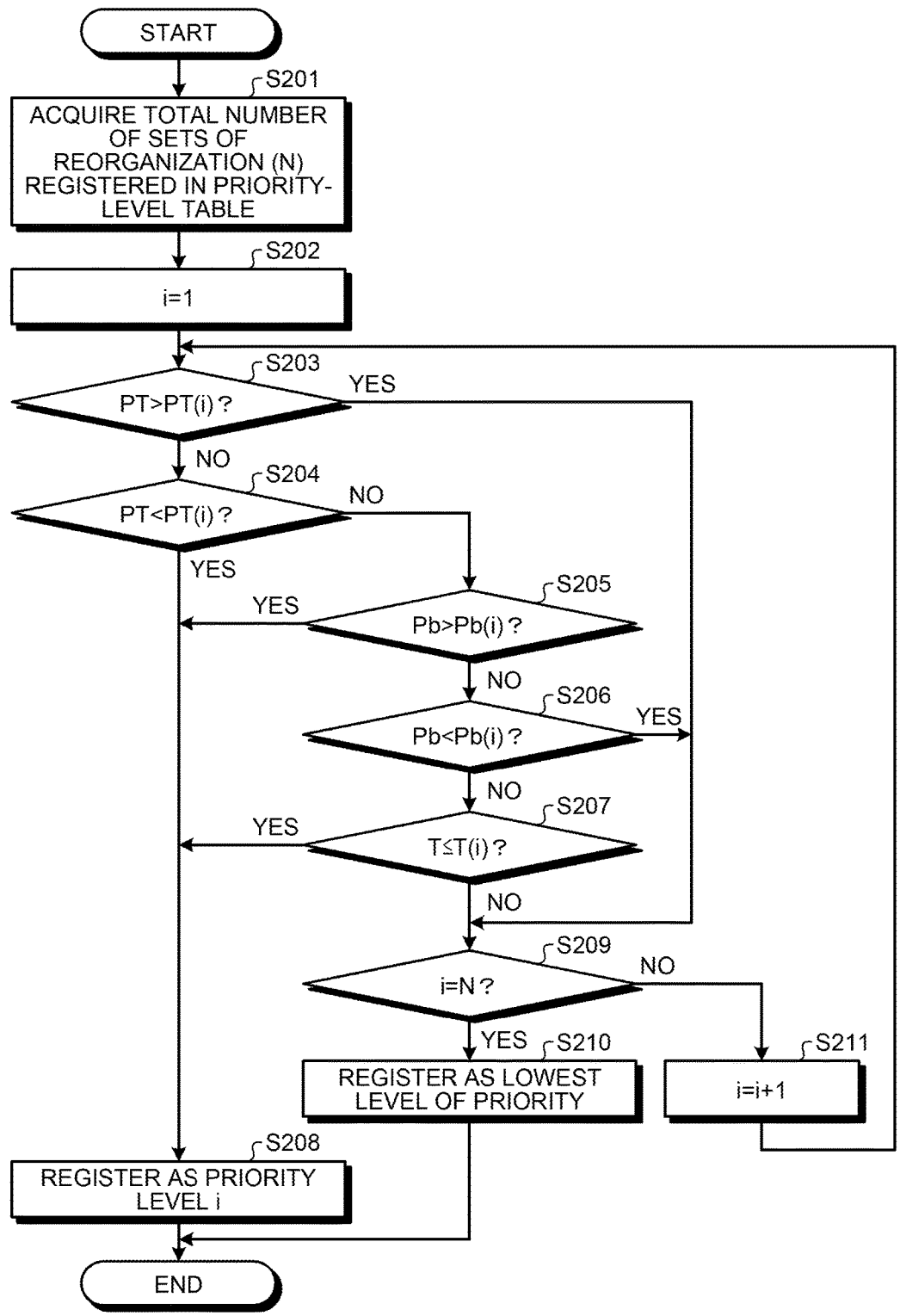
FIG. 8 is a flowchart of a process of determining the level of priority.

With reference to FIG. 8, the flow of a process of determining the level of priority will be described. FIG. 8 is a flowchart of the process of determining the level of priority. The case where the level of priority of subject reorganization is determined in the state where multiple sets of reorganization are registered in the priority-level table 123 will be described. The time of occurrence of the subject reorganization will be represented by "T" below.

The reorganization processing unit 142 acquires the total number of sets of reorganization registered in the priority-level table 123 (step S201). The total number of sets of reorganization registered in the priority-level table 123 is represented by "N".

The reorganization processing unit 142 then sets a variable i representing the level of priority at 1 that is the initial value (step S202). The PV secured capacity of the set of reorganization with the priority level i is represented by Pt(i), the PV returned capacity thereof is represented by Pb(i), and the time of occurrence thereof is represented by "T(i)".

The reorganization processing unit 142 then determines whether the PV secured capacity (Pt) of the subject reorganization is larger than the PV secured capacity (Pt(i)) of the reorganization with the priority level i (step S203). When Pt is larger than Pt(i) (YES at step S203), the reorganization processing unit 142 moves to step S209.

The case where Pt is equal to or lower than Pt(i) (NO at step S203) will be described. In this case, the reorganization processing unit 142 determines whether the PV secured capacity (Pt) of the subject reorganization is smaller than the PV secured capacity (Pt(i)) of the reorganization with the priority level i (step S204).

When Pt is smaller than Pt(i) (YES at step S204), the reorganization processing unit 142 moves to step S208.

The case where Pt and Pt(i) match (NO at step S204) will be described. In this case, the reorganization processing unit 142 determines whether the PV returned capacity (Pb) of the subject reorganization is larger than the PV returned capacity (Pb(i)) of the reorganization with the priority level i (step S205).

When Pb is larger than Pb(i) (YES at step S205), the reorganization processing unit 142 moves to step S208.

The case where Pb is equal to or smaller than Pb(i) (NO at step S205) will be described. In this case, the reorganization processing unit 142 determines whether the PV returned capacity (Pb) of the subject reorganization is larger than the PV returned capacity (Pb(i)) of the reorganization with the priority level i (step S206). When Pb is larger than Pb(i) (YES at step S206), the reorganization processing unit 142 moves to step S209.

On the other hand, when Pb and Pb(i) match (NO at step S206), the reorganization processing unit 142 determines whether the time (T) of occurrence of the subject reorganization is before the time (T(i)) of occurrence of the reorganization with the priority level i (step S207). When T is before T(i) (YES at step S207), the reorganization processing unit 142 moves to step S208.

On the other hand, when T is after T(i) (YES at step S207), the reorganization processing unit 142 moves to step S209.

When $Pt<Pt(i)$, $Pb>Pb(i)$ and $T\leq T(i)$, the reorganization processing unit 142 registers the level of priority of the subject reorganization as the priority level i in the priority-level table 123 (step S208). Furthermore, the reorganization processing unit 142 decrements by one the levels of priority of sets of reorganization whose levels of priority are equal to or lower than that of the reorganization with the priority level i.

When $Pt>Pt(i)$, $Pb<Pb(i)$ or $T>T(i)$, the reorganization processing unit 142 determine whether the priority level i is the lowest level of priority, i.e., whether i matches N (step S209). When i matches N (YES at step S209), the reorganization processing unit 142 registers the level of priority of the subject reorganization as the lowest level of priority in the priority-level table 123 (step S210).

On the other hand, when i does not match N (NO at step S209), the reorganization processing unit 142 increments i by one (step S211) and returns to step S203.

Figure 9:
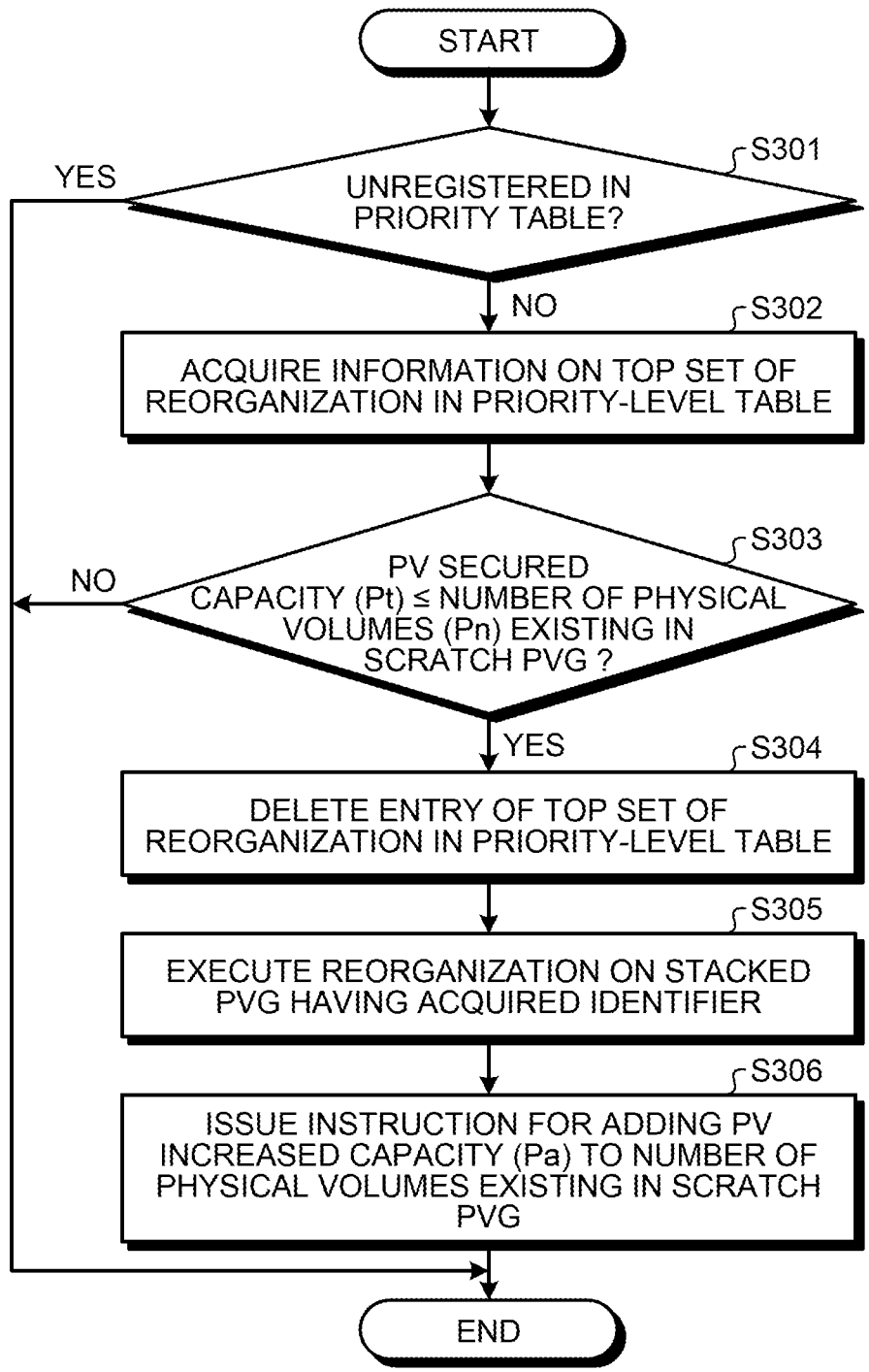
FIG. 9 is a flowchart of a process of executing reorganization.

With reference to FIG. 9, the flow of the process of executing reorganization will be described here. FIG. 9 is a flowchart of a process of executing reorganization.

The reorganization processing unit 142 determines whether reorganization is unregistered in the priority-level table 123 (step S301). When reorganization is unregistered (YES at step S301), the reorganization processing unit 142 stops to execute reorganization.

On the other hand, when reorganization is registered (NO at step S301), the reorganization processing unit 142 selects the top set of reorganization, i.e., the set of reorganization with the highest level of priority. The reorganization processing unit 142 then acquires information on the selected set of reorganization (step S302). The information on the set of reorganization contains, for example, the identifier of the stacked PVG 210, the PV secured capacity (Pt), the PV returned capacity (Pb), and the PV increased capacity (Pa).

The reorganization processing unit 142 then determines whether the PV secured capacity (Pt) of the selected set of reorganization is equal to or smaller than the number of physical volumes 22 (Pn) existing in the scratch PVG 220 (step S303). The number of physical volumes 22 existing in the scratch PVG 220 is represented by "Pn". When Pt is larger than Pn (NO at step S303), the reorganization processing unit 142 stops to execute the set of reorganization.

On the other hand, when Pt is equal to or smaller than Pn (YES at step S303), the reorganization processing unit 142 deletes the entry of the top set of reorganization in the priority-level table 123 (step S304). Furthermore, the reorganization processing unit 142 increments by one the level of priority of each set of reorganization in the priority-level table 123.

The reorganization processing unit 142 then executes reorganization on the stacked PVG 210 having the acquired identifier (step S305).

The reorganization processing unit 142 then issues, to the volume management unit 112, an instruction for adding the PV increased capacity (Pa) to the number of physical volumes 22 (Pn) existing in the scratch PVG 220 having the acquired identifier (step S306). The volume management unit 112 updates the number of physical volumes 22 in the specified scratch PVG 220 to the value obtained by adding Pa to Pn.

With reference to FIGS. 10 to 16, an exemplary process of determining the level of priority performed by the reorganization processing unit 142 will be described specifically. FIG. 10 is a table representing information on sets of reorganization that occur simultaneously. The case will be described where the reorganization processing unit 142 simultaneously determines to execute reorganization on the stacked PVGs 210 having the identifiers A to E represented in FIG. 10. The case will be described where, as the initial state, there are two physical volumes 22 remaining in the scratch PVG 220.

Sets of reorganization on the stacked PVGs 210 having identifies A to E will be described Reorganizations A to E, respectively. The reorganization processing unit 142 may have the information on the sets of reorganization having occurred as a table like that represented in FIG. 11.

The reorganization processing unit 142 selects the sets of reorganization having occurred one by one and determines the level of priority. The case will be described where the levels of priority of the sets of reorganization are determined along the table represented in FIG. 10 from the top.

Figure 11:
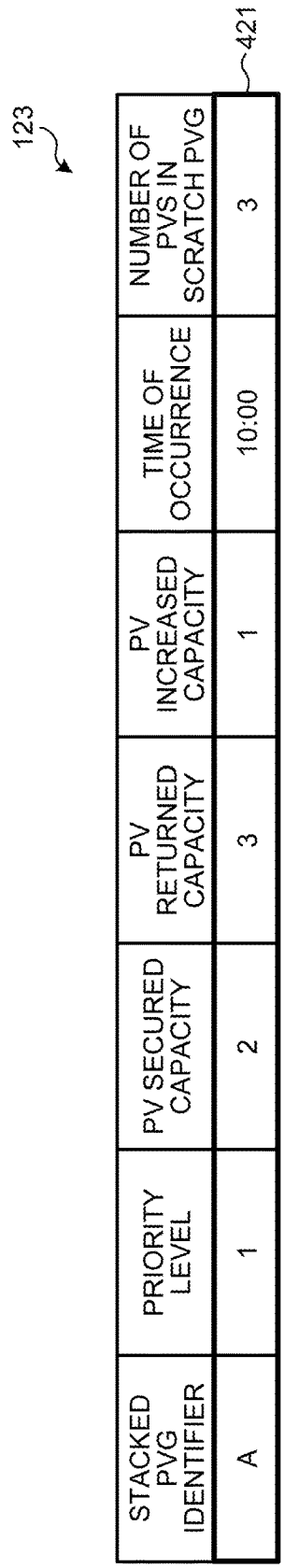
FIG. 11 is a table representing a priority-level table at the stage when the level of priority of Reorganization A is determined.

First of all, the reorganization processing unit 142 acquires information on Reorganization A. In this case, because reorganization is unregistered in the priority-level table 123, the reorganization processing unit 142 registers the information on Reorganization A in the priority-level table 123 with Priority level 1 to generate the priority-level table 123 represented in FIG. 11. FIG. 11 is a table representing the priority-level table at the stage when the level of priority of Reorganization A is determined. As represented in FIG. 11, the information on Reorganization A with Priority level 1 is registered in an entry 421. The entry surrounded with the bold frame in FIG. 11 represents the entry of reorganization whose level of priority is newly determined.

Figure 12:
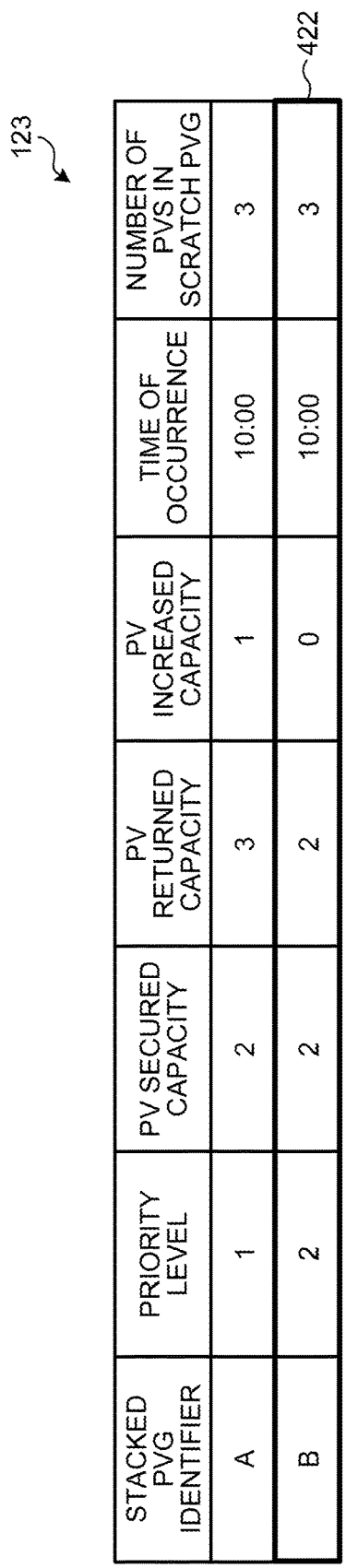
FIG. 12 is a table representing the priority-level table at the stage when the level of priority of Reorganization B is determined.

The reorganization processing unit 142 acquires information on Reorganization B. While the secured capacities of Reorganization A and Reorganization B are equal, the PV returned capacity of Reorganization A is larger than that of Reorganization B. The reorganization processing unit 142 therefore keeps Priority level 1 of Reorganization A and registers the information on Reorganization B with the lowest Priority level 2 in the priority-level table 123 to generate the priority-level table 123 represented in FIG. 12. FIG. 12 is a table representing the priority-level table at the stage when the level of priority of Reorganization B is determined. As represented in FIG. 12, Reorganization B is inserted under Reorganization A as an entry 422.

Figure 13:
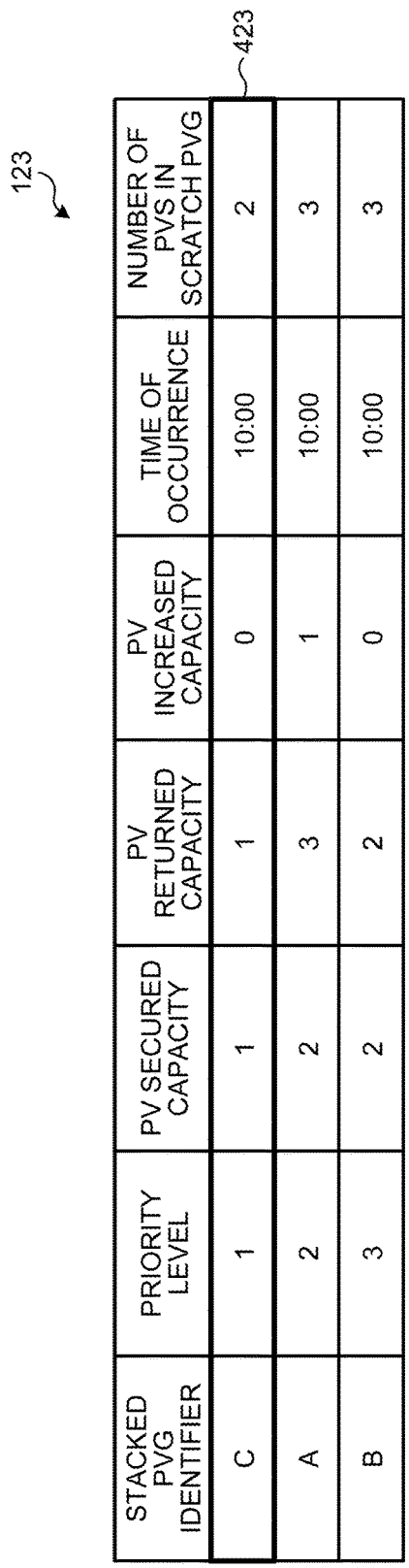
FIG. 13 is a table representing the priority-level table at the stage when the level of priority of Reorganization C is determined.

The reorganization processing unit 142 acquires information on Reorganization C. The PV secured capacity of Reorganization C is smaller than that of Reorganization A. The reorganization processing unit 142 sets the level of priority of Reorganization C at Priority level 1 that is the level of priority of Reorganization A and registers the information on Reorganization C in the priority-level table 123. Furthermore, the reorganization processing unit 142 decrements by one the levels of priority of Reorganization A and Reorganization B to generate the priority-level table 123 represented in FIG. 13. FIG. 13 is a table representing the priority-level table at the stage when the level of priority of Reorganization C is determined. As represented in FIG. 13, Reorganization C is inserted as an entry 423 at the position where Reorganization A is put.

The reorganization processing unit 142 acquires information on Reorganization D. The PV secured capacity of the reorganization D is equal to that of Reorganization C. Furthermore, the PV returned capacity of Reorganization D is larger than that of Reorganization C. The reorganization processing unit 142 therefore sets the level of priority of Reorganization D at Priority level 1 that is the level of priority of Reorganization C and registers the information on Reorganization D in the priority-level table 123. The reorganization processing unit 142 then decrements by one the levels of priority of Reorganizations A to C to generate the priority-level table 123 represented in FIG. 14. FIG. 14 is a table representing the priority-level table at the stage when the level of priority of Reorganization D is determined. As represented in FIG. 14, Reorganization D is inserted as an entry 424 at the position where Reorganization C is put.

The reorganization processing unit 142 acquires information on Reorganization E. The PV secured capacity of Reorganization E is larger than that of Reorganization B with the lowest level of priority. The reorganization processing unit 142 therefore sets the level of priority of Reorganization E at Priority level 5 that is the lowest level of priority and registers the information on Reorganization E in the priority-level table 123 to generate the priority-level table 123 represented in FIG. 15. FIG. 15 is a table representing the priority-level table at the stage when the level of priority of Reorganization E is determined. As represented in FIG. 15, Reorganization E is inserted as an entry 425 under Reorganization B.

For example, as represented in FIG. 15, the number of remaining PVs in any of Reorganizations A to E is equal to or larger that the PV secured capacity. For this reason, the reorganization processing unit 142 is able to execute Reorganizations A to E continuously.

Furthermore, it is assumed that, in the state represented in FIG. 15, Reorganization F occurs in which the PV secured capacity is 1, the PV returned capacity is 1, the PV increased capacity is 0, and the time of occurrence is 10:05. In this case, the reorganization processing unit 142 acquires information on Reorganization F. Regarding While the secured capacity of Reorganization F is equal to that of Reorganization C, the time of occurrence of Reorganization F is after that of Reorganization C. The reorganization processing unit 142 therefore compares Reorganization F and Reorganization A.

Figure 16:
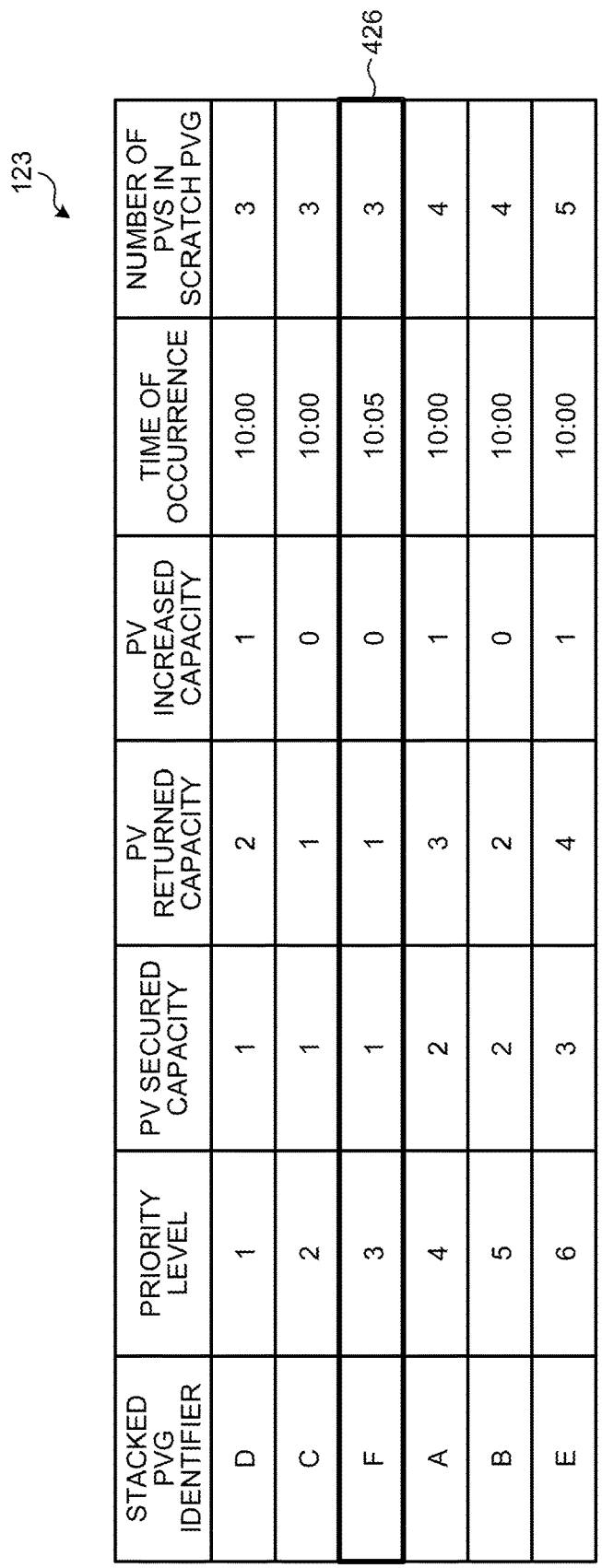
FIG. 16 is a table representing the priority-level table at the stage when the level of priority of Reorganization F is determined.

The PV secured capacity of Reorganization F is smaller than that of Reorganization A. The reorganization processing unit 142 therefore sets the level of priority of Reorganization F at Priority level 3 that is the level of priority of Reorganization A and registers the information on Reorganization F in the priority-level table 123. Furthermore, the reorganization processing unit 142 decrements by one the levels of priority of Reorganizations A, B and E to generate the priority-level table 123 represented in FIG. 16. FIG. 16 is a table representing the priority-level table at the stage when the level of priority of Reorganization F is determined. As represented in FIG. 16, Reorganization F is inserted as an entry 426 at the position where Reorganization A is put.

In this manner, the reorganization processing unit 142 sequentially determines the levels of priority of respective sets of reorganization. Regarding any of Reorganizations A to F, the number of remaining PVs is equal to or larger than the PV secured capacity. For this reason, even when a set of reorganization is added later, the reorganization processing unit 142 is able to execute all Reorganizations A to F continuously.

Hardware Configuration

With reference to FIG. 17, the hardware configuration of the hierarchy control server 10 according to the embodiment will be described. FIG. 17 is a hardware configuration diagram of the hierarchy control server.

The hierarchy control server 10 includes a processor 91, a random access memory (RAM) 92, an internal disk 93, a tape interface 94, an input interface 95, a read device 96, a host interface 97, and a disk interface 98.

The RAM 92, the internal disk 93, the tape interface 94, the input interface 95, the read device 96, the host interface 97, and the disk interface 98 are connected to the processor 91 via a bus.

The input interface 95 is an interface that transmits/receives data to/from the input device 41. An input device 41 is connected to the input interface 95.

A portable recording medium 42, such as a compact disc (CD) or a digital versatile disk (DVD), is inserted into the read device 96 and the read device 96 reads the information of the inserted portable recording medium 42.

The disk interface 98 is an interface for transmitting/receiving data to/from the disk array device 30. The disk array device 30 is connected to the disk interface 98.

The tape interface 94 is an interface for transmitting/receiving data to/from the tape library device 20. The tape library device 20 is connected to the tape interface 94.

The internal disk 93 is, for example, a hard disk and, for example, implements the function of the information storage unit 102 exemplified in FIG. 3. For example, the PVG management table 121, the PV management table 122, and the priority-level table 123 are stored in the internal disk 93. In the internal disk 93, various programs including programs for implementing the functions of the group management unit 101, the read/write unit 103 and the data transfer processing unit 104 illustrated in FIG. 3 are stored.

The processor 91 and the RAM 92 implement the functions of the group management unit 101, the read/write unit 103, and the data transfer processing unit 104.

Specifically, the processor 91 reads the various programs from the internal disk 93, loads the programs in the RAM 92, and executes the programs to implement the functions of the group management unit 101, the read/write unit 103, and the data transfer processing unit 104.

The case where the programs for implementing the functions of the group management unit 101, the read/write unit 103, and the data transfer processing unit 104 are stored in the internal disk 93 is illustrated here. Alternatively, for example, the portable recording medium 42 in which programs for implementing the functions of the group management unit 101, the read/write unit 103, and the data transfer processing unit 104 may be read with the read device 96 and the processor 91 and the RAM 92 may implement the various functions with the read programs.

As described above, the virtual tape library according to the embodiment executes sets of reorganization according to the order of PV secured capacities. Accordingly, regarding the virtual tape library according to the embodiment, the possibility that the number of physical volumes 22 existing in a scratch PVG is larger than the PV secured capacity increases and the possibility that the state where reorganization is not executed can be prevented increases. Accordingly, the virtual tape library according to the embodiment is able to improve continuity of reorganization and accordingly improve continuity of migration.

On the other hand, because the levels of priority of sets of reorganization that occur at early timings are simply set higher in the conventional method, a set of reorganization with a large PV secured capacity may be processed preferentially. Prioritizing the process in which it is not possible to secure physical volumes may stagnation in the whole reorganization process. Meanwhile, the tape library device according to the embodiment significantly improves continuity of reorganization compared to conventional tape library devices.

Furthermore, when the PV secured capacities are equal, the virtual tape library according to the embodiment executes sets of reorganization according to the descending order of PV returned capacities. This increases the possibility that the number of physical volumes 22 existing in a scratch PVG is larger than the PV secured capacity and increases the possibility that the state where reorganization is not executed can be prevented. Accordingly, the virtual tape library according to the embodiment is able to improve continuity of reorganization and accordingly improve continuity of migration.

Improving continuity of migration assuredly secures redundancy of data in the virtual tape library and therefore improves safety of data.

According to the mode of the storage device, the computer readable recording medium, and the storage device control method disclosed herein achieves an effect that data redundancy can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A storage device comprising:
a plurality of storage media;
a group management unit that manages a plurality of first groups to each of which a first storage medium in which data is stored among the storage media belongs and a second group to which a second storage medium in which no data is stored among the storage media belongs;
a data storage unit that regards, as an invalid area, an area of the first storage medium in which data to be updated is stored and that stores, in the first storage medium, updated data from the data;
a data transfer unit that executes a process of selecting some of the first groups, calculating, for each of the selected first groups, the number of the second storage media to be secured to store data that is stored in an area other than the invalid area of the first storage medium having the invalid area, securing the second storage media according to the levels of priority that are determined according to the number of the second storage media to be secured, and transferring the data that is stored in the area other than the invalid area of the first storage medium to the second storage media; and
a moving unit that moves, to the second group, the first medium which belongs in the first group and on which the transfer performed by the data transfer unit completes,
the data transfer unit selects the first group that satisfies a given condition on storage capacity of each of the first groups from among the first groups, when the numbers of the second storage media to be
secured are equal and the numbers of the first storage
media to be moved by the moving unit to the second
group are equal, the data transfer unit determines the
levels of priority according to the timings at which the
given condition is satisfied,
the timings are times of occurrence of subject reorganization at which it is determined that a physical volume group (PVG) subjected to reorganization satisfies a condition on the reorganization.

2. The storage device according to claim 1, wherein, when the numbers of the second storage media to be secured are equal, the moving unit determines the levels of priority according to the number of the first storage media to be moved by the moving unit to the second group.

3. The storage device according to claim 1, wherein the data transfer unit sorts, when multiple sets of execution of reorganization occur concurrently, sets of reorganization according to secured capacities of physical volumes each of which is a volume of physical volumes to be secured to perform reorganization.

4. The storage device according to claim 1, wherein the moving unit specifies, when there is a physical volume without any valid logical volume due to deletion, the physical volume, and changes a group to which the specified physical volume belongs.

5. The storage device according to claim 1, wherein the data transfer unit executes, when physical volume secured capacities are equal, sets of reorganization according to a descending order of physical volume returned capacities so that a possibility that the number of physical volumes existing in the physical volume group is larger than the physical volume secured capacity is increased, and a possibility that a state where reorganization is not executed can be prevented is increased.

6. A non-transitory computer-readable recording medium having stored therein a program that causes a computer to execute a process comprising:
  generating a plurality of first groups to each of which a first storage medium in which data is stored among a plurality of storage media belongs;
  generating a second group to which a second storage medium in which no data is stored among the storage media belongs;
  storing data in the first storage medium;
  regarding, as an invalid area, an area of the first storage medium in which data to be updated is stored and storing, in the first storage medium, updated data from the data;
  executing a process of selecting some of the first groups, calculating, for each of the selected first groups, the number of the second storage media to be secured to store data that is stored in an area other than the invalid area of the first storage medium having the invalid area, securing the second storage media according to the levels of priority that are determined according to the number of the second storage media to be secured, and transferring the data that is stored in the area other than the invalid area of the first storage medium to the second storage media; and
  moving, to the second group, the first medium which belongs in the first group and on which the transferring completes,
  the executing includes selecting the first group that satisfies a given condition on storage capacity of each of the first groups from among the first groups,
  when the numbers of the second storage media to be secured are equal and the numbers of the first storage media to be moved at the moving to the second group are equal, the executing includes determining the levels of priority according to the timings at which the given condition is satisfied,
  the timings are times of occurrence of subject reorganization at which it is determined that a physical volume group (PVG) subjected to reorganization satisfies a condition on the reorganization.

7. A storage device control method comprising:
  generating a plurality of first groups to each of which a first storage medium in which data is stored among a plurality of storage media belongs;
  generating a second group to which a second storage medium in which no data is stored among the storage media belongs;
  storing data in the first storage medium;
  regarding, as an invalid area, an area of the first storage medium in which data to be updated is stored and storing, in the first storage medium, updated data from the data;
  executing a process of selecting some of the first groups, calculating, for each of the selected first groups, the number of the second storage media to be secured to store data that is stored in an area other than the invalid area of the first storage medium having the invalid area, securing the second storage media according to the levels of priority that are determined according to the number of the second storage media to be secured, and transferring the data that is stored in the area other than the invalid area of the first storage medium to the second storage media; and
  moving, to the second group, the first medium which belongs in the first group and on which the transferring completes,
  the executing includes selecting the first group that satisfies a given condition on storage capacity of each of the first groups from among the first groups,
  when the numbers of the second storage media to be secured are equal and the numbers of the first storage media to be moved at the moving to the second group are equal, the executing includes determining the levels of priority according to the timings at which the given condition is satisfied,
  the timings are times of occurrence of subject reorganization at which it is determined that a physical volume group (PVG) subjected to reorganization satisfies a condition on the reorganization.

* * * * *